3,421,477
DIP COATING APPARATUS
Theodore E. Gilbert, Grand Island, and Otto H. Lindemann, Buffalo, N.Y., assignors to Hooker Chemical Corporation, Niagara Falls, N.Y., a corporation of New York
Filed May 25, 1964, Ser. No. 369,967
U.S. Cl. 118—602     2 Claims
Int. Cl. B05c *11/00*

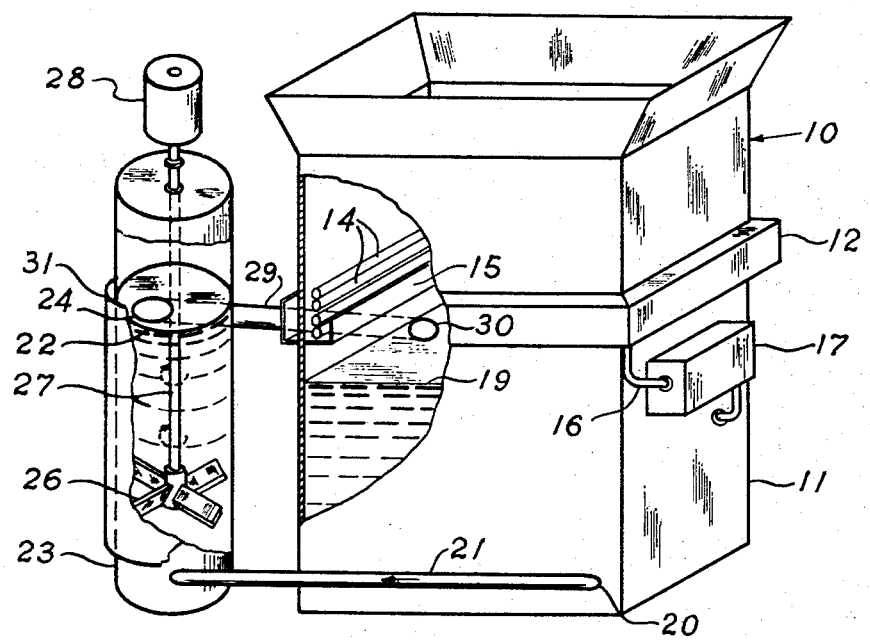
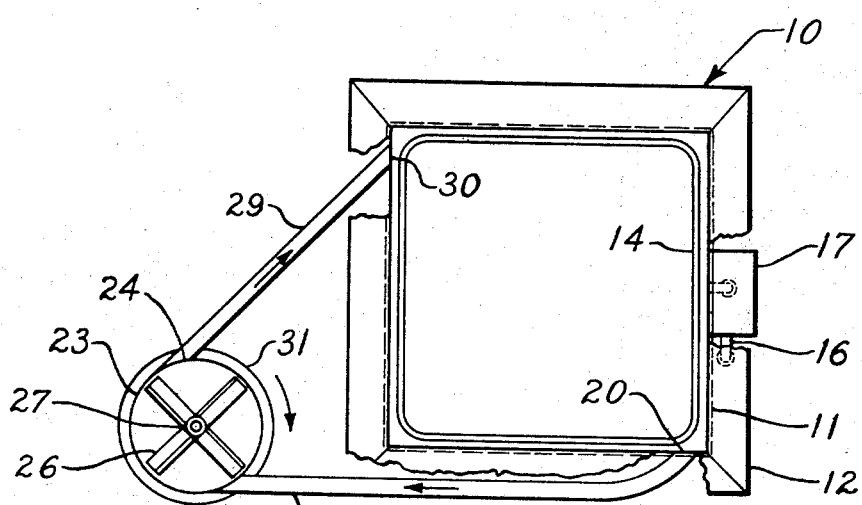

ABSTRACT OF THE DISCLOSURE

Dip coating apparatus which includes a coating tank and a mixing chamber which is located externally of the coating tank. Inlet and outlet means are tangentially disposed adjacent the top and bottom, respectively, of the coating tank and adjacent the bottom and top, respectively, of the mixing chamber, conduit means being provided to connect the outlet of the coating tank and the inlet of the mixing chamber, and vice versa. Agitation means are provided in the mixing chamber which effect withdrawal of the coating composition from the coating tank to the mixing chamber and maintain a coating composition level in the mixing chamber which is above that in the coating tank, thereby causing a substantially non-turbulent, gravity flow of the admixed coating composition from the mixing chamber back into the coating tank.

---

This invention relates to a coating apparatus and more particularly to a dip coating apparatus for the application of protective coatings having means for maintaining coating compositions in a homogeneous condition.

Protective coatings have usually been applied to surfaces by one of several known coating techniques. One of the more frequently used methods in commercial operations is dip coating. Dip coating comprises submerging the article to be coated into a tank of liquid coating composition and withdrawing it. This process is particularly suited to high volume commercial operations which require complete and rapid coating.

In recent years, several important contributions to the basically simple process of dip coating have been made. The introduction of halogenated hydrocarbon solvents led to the development of hot coating techniques and to what is known as trichlorethylene coating. Heavily halogenated hydrocarbon solvents will not ignite even when heated to their boiling points under ordinary use conditions. Therefore, coating compositions based on halogenated hydrocarbon solvents can be heated to expedite the dip coating process. Solvents for coating compositions other than halogenated hydrocarbon solvents, are normally combustible and therefore cannot be used at elevated temperatures without creating serious fire and explosion hazards.

The difficulty of maintaining pigments and fillers in a homogeneous condition, such as is important for dip coating, is increased by the use of elevated temperatures. Coating compositions used for dip coating are normally reduced to a very low viscosity. The low viscosity permits rapid penetration of the coating composition into crevices and inside corners of the article being coated and reduces the time required for drainage. Thus the low viscosity coating compositions are advantageous in many respects. However, this low viscosity creates the problem of maintaining a homogeneous coating composition. Coating compositions containing insoluble pigments and fillers are difficult to maintain in uniform suspended condition throughout the coating composition. The use of elevated temperatures further accelerates the settling or flotation of the pigments. Unless the pigments are maintained in a homogeneous condition throughout the coating composition, articles coated by dipping are unsatisfactory because a uniform surface finish is not obtained. The lack of uniformity in the coating composition causes streaking and irregularities in color and lack of uniformity of thickness of the coating applied.

To alleviate this undesirable effect, the tank should be maintained under agitation. However, normal agitation creates an additional problem in that it has usually been thought to be important to maintain the liquid surface free from turbulence. A turbulent surface causes lapping or a corduroy effect on the article coated, which may often be eliminated or reduced by maintaining a still liquid surface.

It is an object of this invention to provide an apparatus for maintaining a homogeneous coating composition within a dip coating tank while maintaining an undisturbed liquid surface.

Another object of this invention is to provide an apparatus which eliminates an in-tank agitation means. A further object of this invention is to provide a dip coating apparatus and homogenizing means particularly suited for halogenated hydrocarbon solvent coating techniques.

These and other objects will become apparent to those skilled in the art from the description of the invention.

The objects of this invention are accomplished by an apparatus comprising a reservoir for liquids having an inlet near the top of the reservoir and an outlet near the bottom of the reservoir, said outlet having means for conveying liquids to a mixing chamber, the chamber being located externally of said reservoir and having agitating means which produce a liquid level in the chamber higher than the liquid level in the reservoir, and means for reconveying liquids to the inlet in the reservoir.

The apparatus described has advantages over previous dip coating apparatuses. The agitating means does not occupy valuable tank area. This permits larger articles to be coated in the tank without interfering with the agitating means. Turbulence on the surface area of the coating composition is eliminated by the gentle non-turbulent return of liquid coating compositon. The liquid returning to the tank flows by force of gravity and not by the direct force of pumps or propellers. The present apparatus creates a continuously circulating system maintaining the coating composition homogeneous.

The invention will be described with reference to the drawing in which:

FIG. 1 is a partially cutaway view of the apparatus of this invention; and

FIG. 2 is a partially broken away top plan view thereof.

Coating apparatus 10 comprises a reservoir or coating tank 11, circulating means or lines 21 and 29 and agitation chamber or cylinder 23. The apparatus illustrated is particularly suited for use in methods conducted at elevated temperature and utilizing coatings comprising halogenated hydrocarbon solvents. However, this apparatus is also useful for room temperature coating using conventional solvents.

Coating tank 11 contains therein cooling coils 14 through which a cooling liquid such as water may be circulated and condensation trough 15 located above the liquid coating level 19 surrounding the internal reservoir area. The external wall of coating tank 11 has a water jacket 12 positioned opposite the internally positioned cooling coils 14. Water jacket 12 and cooling coils 14 create a chilled area across the liquid surface 19. By condensation, this chilled area retains solvent volatilized at the elevated operating temperatures and thereby eliminates a solvent loss to the atmosphere.

Directly below cooling coils 14 and above the liquid surface 19 is condensation trough 15. Condensed solvents collect in trough 15 and are returned to the coating composition by means of drain 16 and water separator 17. Water separator 17 separates the solvent from water vapor condensed in the chilled zone from the atmosphere and the solvent separated is returned to the reservoir.

Located near the bottom of coating tank 11 is outlet 20. Outlet 20 is positioned so as to be at substantially the greatest distance from inlet 30, located in the upper portion of the coating tank 11. By so positioning inlet 30 and outlet 20, circulation of coating composition is substantially complete throughout coating tank 11.

Line 21 connected to outlet 20 provides means for conveying liquid coating composition to agitation cylinder 23. A suction action is created by agitator 26 located in agitation cylinder 23 so as to withdraw liquid from coating tank 11. During operation, a continuous flow of liquid is withdrawn from coating tank 11 by means of outlet 20 and line 21 to agitation cylinder 23.

Agitator 26 is a propeller or other impeller rotated by means of motor 28 and shaft 27, or otherwise activated. Agitator 26 is such that it causes a mixing action within agitation cylinder 23 and raises the liquid level above that in coating tank 11. The speed of agitator 26 is determined by the blade pitch and mixing action of the particular design. The speed can be varied between about 100 revolutions per minute up to about 4,000 revolutions per minute. For agitators having a greater pitch, lower speeds result in the desired mixing action and raise the liquid level in the agitation cylinder, than is the case for an agitator having lesser pitch.

Located in the upper portion of agitation cylinder 23 is outlet 24 connected to return line 29 providing means for reconveying liquids by force of gravity to coating tank 11. Return line 29 carries liquid coating compositions back to coating tank 11 through inlet 30. Return line 29 is substantially level or slightly sloped toward coating tank 11 and is connected to agitation cylinder 23 below liquid level 22 at outlet 24, the other end being connected to inlet 30 located in coating tank 11. Inlet 30 is positioned at the liquid surface 19 or slightly below this level. The liquid level 22 within agitation cylinder 23 is above outlet 24 thus creating a gravitational force to cause flow of the liquid coating composition out of the agitation cylinder and through return line 29. Liquid passing into the coating tank at inlet 30 flows in a gentle non-turbulent manner since it is not acted on by a strong force.

FIGURE 2 particularly illustrates the attachment of lines 21 and 29 to agitation cylinder 23 and coating tank 11. The lines are preferably attached in a tangential manner so as to eliminate sharp turns and elbows. The tangential connections have been found to facilitate smooth flow of liquid with minimums of resistance and turbulence at the surface of the coating material within the dip tank.

Agitation cylinder 23 has temperature control means 31, such as a heating jacket, cooling coils, used to heat or cool the liquid coating composition, thus maintaining the desired temperature within coating tank 11. The good agitation within the cylinder permits even heating of the coating composition or paint without searing or hardening as may often happen due to intense direct heating in conventional units. When the apparatus of this invention is used with halogeated hydrocarbon solvents at elevated temperatures, temperature control jacket 31 heats the liquid coating composition to temperatures of about 50 to 150 degrees centigrade. The temperature to which the composition is heated is preferably just below the boiling point of the solvent used. When using trichlorethylene the composition is heated to about 88 degrees centigrade. When conventional solvents are used, it is not usually desirable to heat the coating composition and temperature control jacket 31 can be eliminated. Other means of heating the coating composition can also be used, such as direct or indirect heating of coating tank 11 as the sole or a supplementary source of heat. Coating tank 11 is preferably insulated to decrease the heat requirements.

The apparatus of the present invention is exceptionally versatile in that it can be used as a single unit in small production operations, laboratory experimental uses or may be combined with large scale automated production equipment. The externally positioned agitation means is particularly well suited for laboratory scale operation in that a minimum of space is required for the maximum coating area. For these reasons smaller quantities of coating compositions can also be used for a given article size.

The apparatus is readily adapted for continuous coating operations. Operations such as those incorporating a degreasing step, a phosphatizing step, a coating step and a subsequent curing step may use the coating apparatus of this invention in the coating step. Such continuous automated operations utilize conveyors to transport articles being coated through the system so as to degrease, phosphatize, coat and cure in a continuous manner.

Because of the increased efficiency of halogenated hydrocarbon solvent systems operated at elevated temperatures, the apparatus of this invention is preferably used in conjunction with halogenated hydrocarbon systems. Examples of such systems comprise coating compositions such as paints, varnishes, lacquers, enamels and the like using halogenated aliphatic hydrocarbon solvents to reduce the viscosity, such as trichlorethylene, perchlorethylene, the trichlorethanes and tetrachlorethanes, methylene chloride, ethylene dichloride, ethylidene chloride, the dichlorotetrafluoroethanes, the trichlorotrifluoroethanes, the trichloroodifluoroethanes, the tetrachlorodifluoroethanes, the fluorotrichloroethanes, the fluorotetrachloroethanes, methyltrichloroethylene, 1,2-dichloropropane, 1,2-dichloropropene, 1,1,2-trichloropropane, ethyltrichloroethylene and mixtures thereof, as well as other halogenated compounds similar in properties to those recited above.

As will be noted, these solvents are often of about 1 to 4 carbon atoms and about 1 to 6 halogen atoms. Of these, the preferred material is trichloroethylene.

The apparatus of this invention is operated by filling the reservoir with coating composition so as to be above the level of inlet 30. The level can be further adjusted after starting the agitator. Liquid coating composition is withdrawn from the reservoir, agitated, heated or cooled as desired and returned to the reservoir in a non-turbulent and continuous manner. The agitation produces a uniform coating composition within the reservoir particularly suited for dip coating.

Articles to be coated are placed on hangers or in suitable baskets and submerged in the coating composition. They are then withdrawn in a manner so as to least disturb the surface of the liquid. When halogenated hydrocarbons are used the coating composition is maintained at an elevated temperature. Solvent volatilized at the elevated temperature is condensed by the chilled zone maintained above the surface of the liquid in the reservoir. The condensed solvent is collected and returned to the reservoir.

Additional coating composition is continuously or periodically added to the reservoir to replenish that used.

While there have been described various embodiments of the invention, the composition and methods described are not intended to be understood as limiting the scope of the invention. It is realized that changes therein are possible and it is further intended that each element recited in any of the following claims is to be understood as referring to all equivalent elements for accomplishing substantially the same results in substantially the same or equivalent manner. It is intended to cover the invention broadly in whatever form its principle may be utilized.

What is claimed is:

1. An apparatus for dip coating which comprises a coating tank adapted to contain a liquid coating composition, inlet means adjacent the top of said tank, said inlet being positioned so that liquid coating composition introduced therethrough enters the coating tank substantially tangentially to the coating tank walls, at a point which is not substantially above the level of the coating composition in the tank, outlet means adjacent the bottom of the coating tank, said outlet means being positioned so that liquid coating composition removed therethrough leaves the coating tank substantially tangentially to the coating tank walls at a point which is at substantially the greatest distance from said inlet means, a mixing chamber located externally of the coating tank, said mixing chamber having an inlet means adjacent the bottom thereof, positioned so that liquid coating composition introduced therethrough enters the mixing chamber substantially tangentially to the walls of said mixing chamber and an outlet means adjacent the top thereof, positioned so that liquid coating composition removed therethrough leaves the mixing chamber substantially tangentially to the walls of said mixing chamber at a point which is at substantially the greatest distance from the mixing chamber inlet, a first conduit means connecting the outlet of said coating tank and the inlet of said mixing chamber, a second conduit means connecting the outlet of said mixing chamber and the inlet of said coating tank, and a bladed propelling agitation means so positioned within said mixing chamber as to withdraw liquid coating composition from said coating tank into said mixing chamber through said first conduit means, effect mixing of said liquid coating composition within said mixing chamber, maintain a liquid level of coating composition in said mixing chamber which is higher than the liquid level of coating composition in said coating tank and to cause a substantially nonturbulent, gravity flow of said admixed coating composition from said mixing chamber to said coating tank through said second conduit means.

2. The apparatus as claimed in claim 1 wherein the mixing chamber is formed with a heating jacket adapted to maintain the liquid coating composition within the mixing chamber at the desired temperature for reintroduction into the coating tank.

References Cited

UNITED STATES PATENTS

| | | | |
|---|---|---|---|
| 2,875,094 | 2/1959 | Bloem et al. | 118—602 X |
| 2,970,819 | 2/1961 | Kleebauer | 259—95 |
| 2,997,373 | 8/1961 | Stephens | 259—95 X |
| 1,988,955 | 1/1935 | Nehmert | 118—429 |
| 2,633,436 | 3/1953 | Martin | 259—95 X |
| 2,739,567 | 3/1956 | Jones et al. | 118—602 X |
| 2,773,280 | 12/1956 | Albright et al. | 118—602 X |
| 2,991,753 | 7/1961 | Dearsley | 118—602 X |

DANIEL BLUM, *Primary Examiner.*

U.S. Cl. X.R.

118—429, 612; 134—191; 259—95